United States Patent [19]

Yanagidate

[11] Patent Number: 5,220,549
[45] Date of Patent: Jun. 15, 1993

[54] INFORMATION RECORDING/REPRODUCING APPARATUS WHICH INCLUDES PICKUP HAVING MEMORY FOR STORING SPECIFIC CHARACTERISTICS THEREOF

[75] Inventor: Masaharu Yanagidate, Sagamihara, Japan

[73] Assignee: Olympus Optical Co., Ltd., Tokyo, Japan

[21] Appl. No.: 657,507

[22] Filed: Feb. 19, 1991

[51] Int. Cl.⁵ .............................................. G11B 7/00
[52] U.S. Cl. ............................ 369/44.29; 369/44.11; 369/32; 369/116
[58] Field of Search ............... 369/44.29, 44.11, 44.12, 369/44.13, 44.14, 44.17, 44.18, 44.23, 44.25, 44.28, 44.32, 44.35, 44.36, 116, 41, 32, 106, 13, 14, 48; 250/201.5

[56] References Cited

U.S. PATENT DOCUMENTS

| | | | |
|---|---|---|---|
| 4,527,263 | 7/1985 | Nakagawa | 369/44.32 |
| 4,562,565 | 12/1985 | Tamura | 369/44.36 |
| 4,710,908 | 12/1987 | Ohshima et al. | 369/44.11 |
| 4,926,405 | 5/1990 | Hangai et al. | 369/44.11 |
| 4,941,138 | 7/1990 | Chida et al. | 369/44.11 |
| 5,001,688 | 3/1991 | Louvenberg et al. | 369/57 |
| 5,025,431 | 6/1991 | Naito | 369/34 |
| 5,065,387 | 11/1991 | Roth et al. | 369/44.11 |
| 5,072,435 | 12/1991 | Bakx | 369/48 |

*Primary Examiner*—Jeffery A. Brier
*Assistant Examiner*—Thai Tran
*Attorney, Agent, or Firm*—Frishauf, Holtz, Goodman & Woodward

[57] ABSTRACT

In an information recording/reproducing apparatus, a pickup performs recording/reproducing of information to be recorded/reproduced to or from a recording/reproducing medium. A memory is provided with the pickup, and stores specific characteristic data of the pickup. A pickup relating unit performs operations relating to the recording/producing of the information by the pickup. An automatic controlling unit reads the specific characteristic data stored in the memory and automatically controls the operational characteristics of the pickup relating unit in accordance with the specific characteristic data.

21 Claims, 4 Drawing Sheets

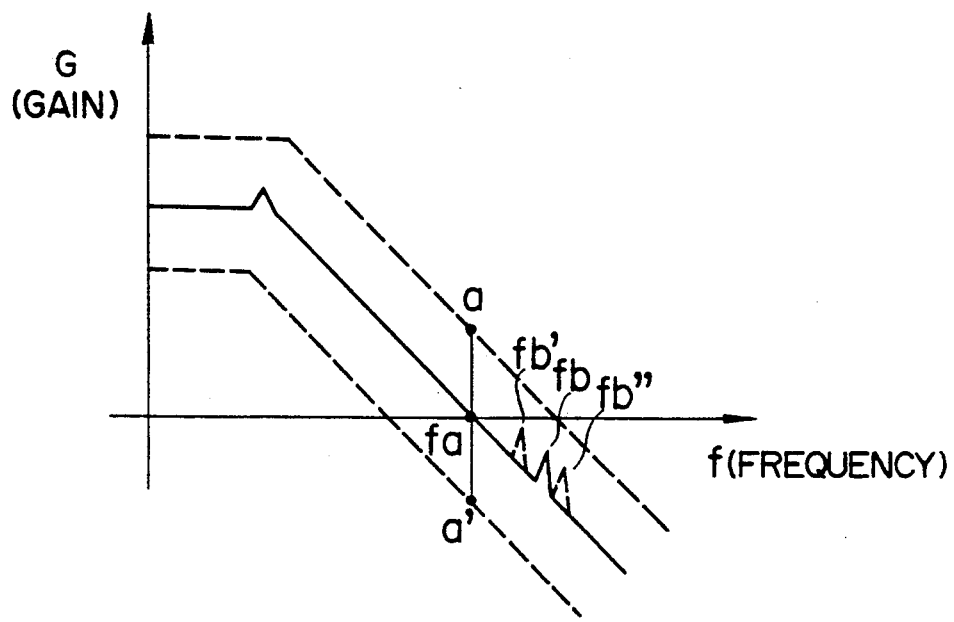
F I G. 3
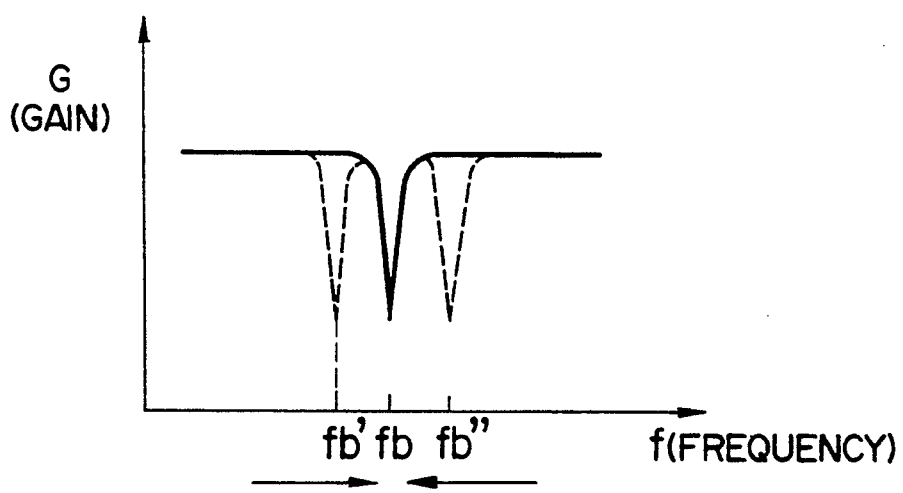
F I G. 4

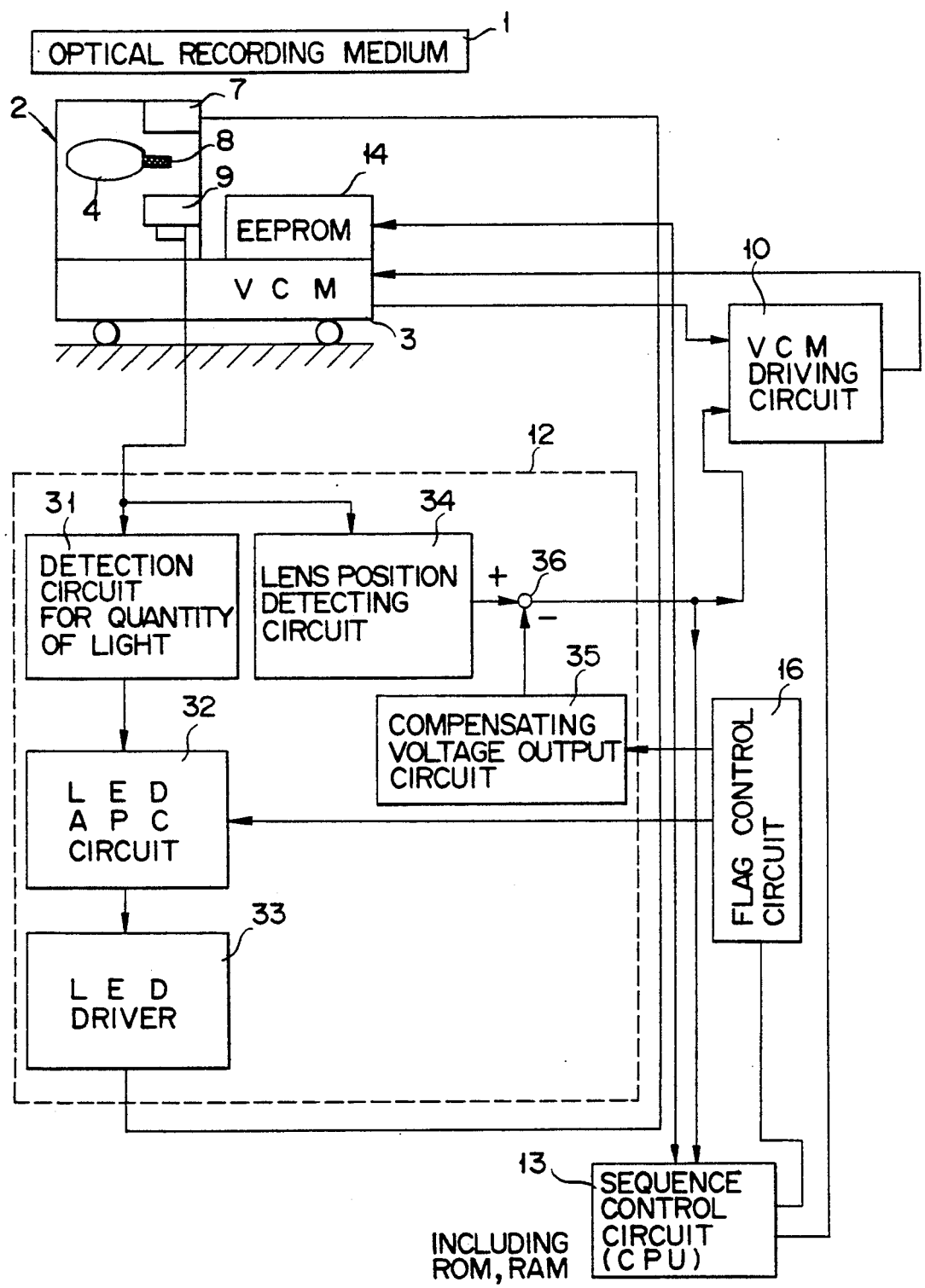
F I G. 5

INFORMATION RECORDING/REPRODUCING APPARATUS WHICH INCLUDES PICKUP HAVING MEMORY FOR STORING SPECIFIC CHARACTERISTICS THEREOF

BACKGROUND OF THE INVENTION

1. Field of the Invention

The present invention generally relates to an information recording/reproducing apparatus, and particularly to a information recording/reproducing apparatus for recording/reproducing information to be recorded/reproduced to or from an information recording medium by using a pickup.

2. Description of the Related Art

In the conventional information recording/reproducing apparatus using a pickup, since there is deviation in the characteristic every pickup, the operational characteristic must be controlled by the manual operation to be appropriate for the pickup in accordance with the characteristic of the pickup mounted every apparatus.

However, in the conventional information recording/reproducing apparatus, since the operational characteristic is controlled by the manual operation to be appropriate for the pickup in accordance the characteristic of the pickup mounted every apparatus, there is a problem in that productivity is bad. Also, every time the pickup is exchanged, the adjustment is required. Due to this, there is a problem in that maintenance is bad.

SUMMARY OF THE INVENTION

It is, therefore, an object of the present invention to provide a new and improved information recording/reproducing apparatus in which a pickup having a memory for storing characteristics thereof in order to compensate for deviation in the characteristics of the pickup, thereby productivity and maintenance can be improved.

In order to achieve the above object, the present invention provides an information recording/reproducing apparatus wherein a memory means is provided with a pickup and specific characteristic data of the pickup is stored therein, and an operational characteristic of the apparatus is automatically set by a setting means in order to be appropriate for the pickup in accordance with the specific characteristic data read from the memory means.

According to one aspect of the present invention, there is provided an information recording/reproducing apparatus, comprising:

pickup means for recording/reproducing information to be recorded/reproduced to or from a recording/reproducing medium;

memory means, provided with the pickup means, for storing specific characteristic data of the pickup means;

pickup relating means for performing operations relating to the data recording/reproducing by the pick means; and automatic controlling means for reading the specific characteristic data stored in the memory means and automatically controlling operational characteristics of the pickup relating means in accordance with the specific characteristic data.

Additional objects and advantages of the invention will be set forth in the description which follow, and in part will be obvious from the description, or may be learned by practice of the invention. The objects and advantages of the invention may be realized and obtained by means of the instrumentalilties and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 3 and 4 are views showing the operation of FIG. 2; and

FIG. 5 is a view showing the structure of a flag servo circuit shown in FIG. 1.

DETAILED DESCRIPTION OF THE PREFERRED EMBODIMENTS

Figure 1:
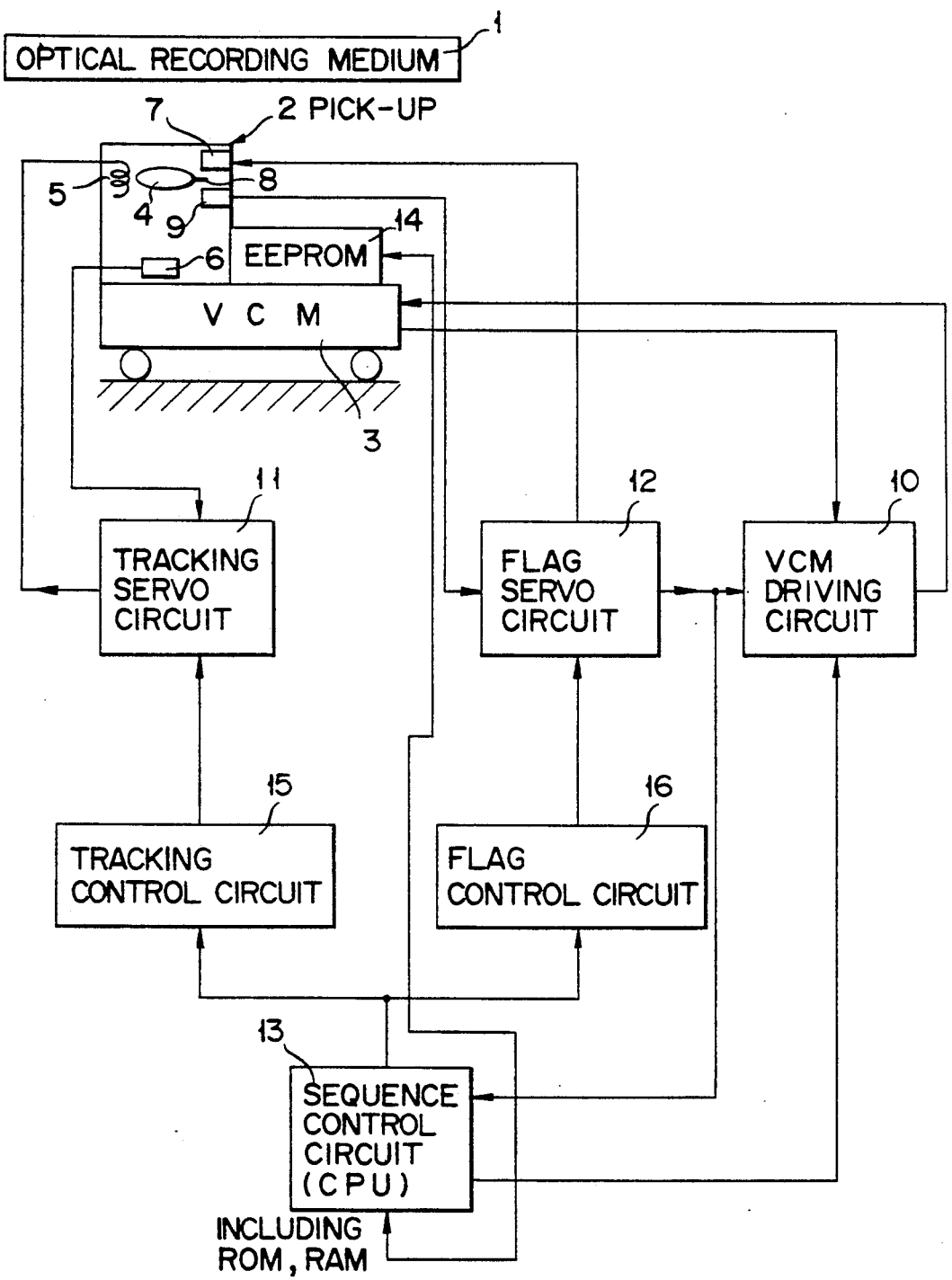
FIG. 1 is a view showing the structures of the main parts of one embodiment of an information recording-/reproducing apparatus according to the present invention.

Reference will now be made in detail to the presently preferred embodiments of the invention as illustrated in the accompanying drawings, in which like reference characters designate like or corresponding parts throughout the several drawings.

FIG. 1 is a view showing the structures of the main parts of one embodiment of an information recording-/reproducing apparatus according to the present invention. In this embodiment, to or from an optical recording medium 1, information recording/reproducing is performed by use of a pickup 2. The pickup 2 is driven in a direction (tracking direction) substantially crossing a track of the optical recording medium 1 by a voice coil motor (VCM) 3.

The pickup 2 is constituted similar to the well-known optical pickup which optically performs information recording/reproducing to or from the optical recording medium. Particularly, in FIG. 1, there are illustrated an objective lens 4, which focuses a recording or reproducing light beam on the optical recording medium 1, a tracking coil 5, which drives the objective lens 4 in the tracking direction, a photodetector 6, which receives reflected light from the optical recording medium 1 and detecting the displacement (tracking error signal) of the objective lens 4 in the tracking direction, a light-emitting diode (LED) 7, which detects the displacement of the objective lens in the tracking direction from the neutral position, a flag 8, and a photodetector 9. The flag 8 is provided to be moved together with the objective lens 4. The photodetector 9 has a two-divided light receiving regions and receives a projection image of the flag 8 in the regions.

Moreover, the VCM (voice coil motor) 3 is driven by a VCM driving circuit 10. By the driving of the VCM 3, a position pulse is generated and the position pulse is supplied to the VCM driving circuit 10.

The output of the photodetector 6 of the pickup 2 is supplied to a tracking servo circuit 11 as a tracking error signal. The tracking servo circuit 11 supplies a control current to the tracking coil 5 so that the tracking error signal to be input becomes zero. Thereby, the driving of the objective lens 4 in the tracking direction is suitably controlled. Moreover, the output of the photodetector 9 is supplied to the flag servo circuit 12. In the flag servo circuit 12, the sum of the outputs of the two-divided light receiving regions of the photodetector 9 is detected and the amount of light-emitting of the LED 7 is controlled based on the sum signal. Furthermore, in the flag servo circuit 12, the difference in the outputs of the two-divided light receiving regions of the photodetector 9 is detected and a signal, which is based on the differential signal, is supplied to the VCM driving circuit 10 and a sequence control circuit 13 explained later.

The VCM driving circuit 10 control the driving of the VCM 3 so that the input signal sent from the flag servo circuit 12 becomes zero. At the same time, in the seek operation, which retrieves a predetermined track, the VCM driving circuit 10 controls the driving of the VCM 3 based on a target position sent from the sequence control circuit 13 and the position pulse representing a position of the VCM 3 sent from the VCM 3.

In the above-mentioned structure, a tracking loop, which comprises the pickup 2 and the tracking servo circuit 11, needs a predetermined characteristic. Therefore, since the characteristic of the pickup 2 deviates in a certain range because of deviation in structural members used therein, it is necessary to compensate for deviation in order to obtain a predetermined characteristic of the tracking servo loop. Also, a flag servo loop, which comprises the pickup 2, the flag servo circuit 12, the VCM driving circuit 10 and the VCM 3, needs a predetermined characteristic. Therefore, the neutral position of the objective lens 4 is a position of the objective lens 4 where the tracking servo loop is cut. There occurs deviation in the neutral position, depending on the characteristic of the mechanical member supporting the objective lens 4, the change of temperature, the inclination of the pickup 2, and secular change. Since the original point of the detection of the position signal of the objective lens 4, which is detected based on the output of the photodetector 9, is determined by the positional relationship among the LED 7, the flag 8, and the photodetector 9, the original point does not always coincide with the neutral position of the objective lens 4. Therefore, regarding the flag servo loop, it is necessary to compensate for the above-mentioned deviation in order to obtain a predetermined characteristic.

In the conventional apparatus, the above-mentioned deviation in the pickup 2 is manually controlled and compensated in order that the characteristics of the tracking servo circuit 11 and the flag servo circuit 12 are appropriate for the pickup 2. Due to this, the above-mentioned problem relating productivity and maintenance occurred.

According to the embodiment of the present invention, in order to solve the above-mentioned problem, there is provided an electrically erasable and programmable read only memory (EEPROM) 14 which serves as memory means, in the pickup 2, and the specific characteristic data of the pickup 2 is stored in the EEPROM 14. The characteristic data stored in the EEPROM 14 is read by a sequence control circuit 13. The sequence control circuit 13 automatically controls the characteristic of the tracking servo circuit 11 via a tracking control circuit 15 based on the read data in order to be suitable for the pickup 2. Similar to the tracking servo loop, the sequence control circuit 13 automatically controls the characteristic of the flag servo circuit 12 via a flag control circuit 16 in order to be suitable for the pickup 2.

Also, the neutral position of the objective lens 4 in the flag servo loop changes, depending on the change of temperature, the inclination of the pickup 2, and the secular change. Due to this, according to the embodiment, for example, the difference between the neutral position of the objective lens 4 and the original point of the detection position detected by the flag servo circuit 12 is measured by the sequence control circuit 13 when power is applied. Then, based on the measured value, the sequence control circuit 13 calculates a compensating voltage by which the difference between the neutral position of the objective lens 4 and the original point of the detection position detected by the flag servo circuit 12 becomes zero and stores data in the EEPROM 14 or a random access memory (RAM) within a CPU explained later. Then, based on the compensating voltage, the sequence control circuit 13 automatically controls the characteristic of the flag servo circuit 12 via a flag control circuit 16. The sequence control circuit 13 includes a controller having a microcomputer (CPU) and its peripheral circuits including ROMs and RAMs.

Figure 2:
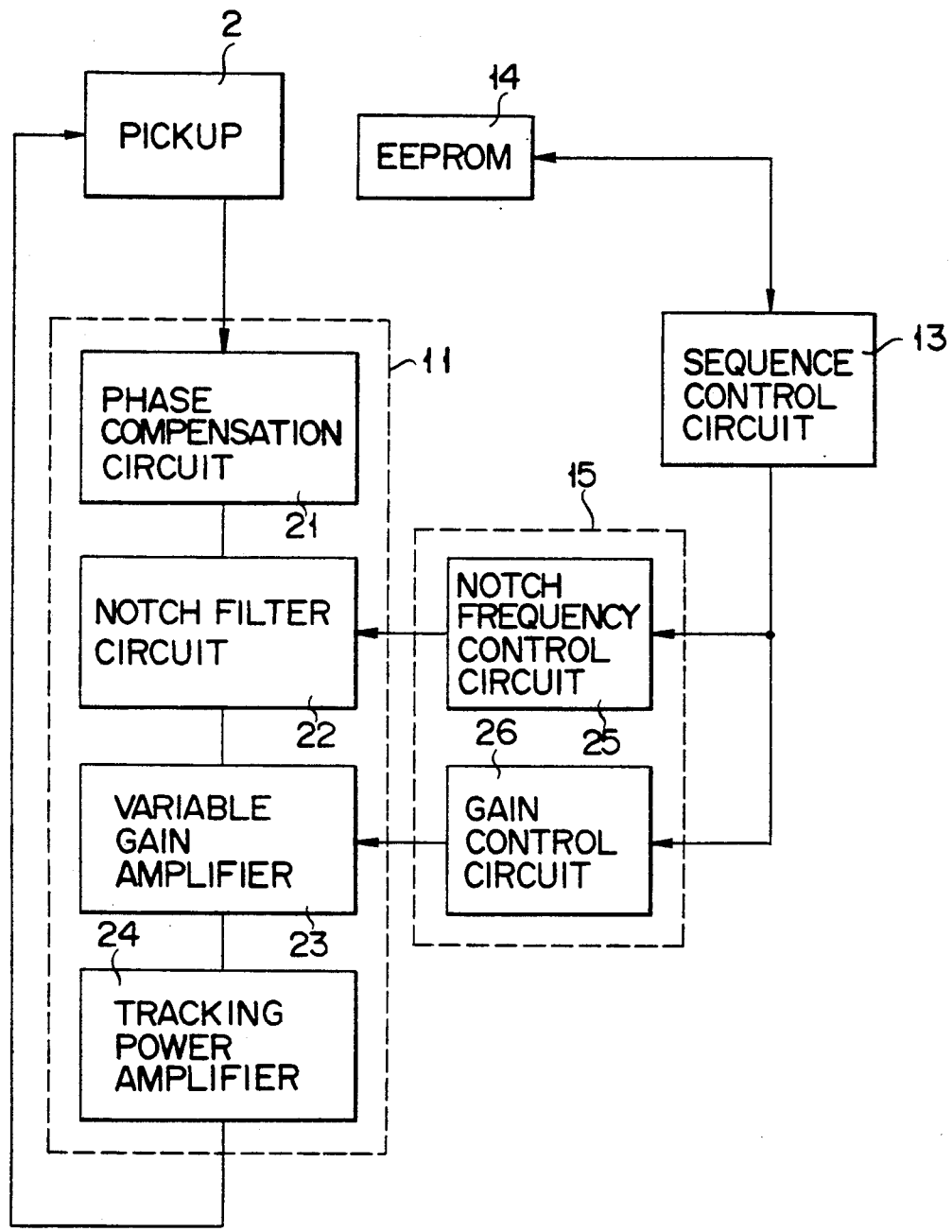
FIG. 2 is the structure of a tracking servo circuit shown in FIG. 1 and that of a tracking controlling circuit.

FIG. 2 is the structure of a tracking servo circuit 11 shown in FIG. 1 and that of a tracking controlling circuit 15. The tracking servo circuit 11 comprises a phase compensation circuit 21, which applies a phase-lead in the vicinity of a zero cross frequency (fa) of the pickup 2 to the output of the photodetector 6, a notch filter circuit 22, which sets a notch frequency in a resonance frequency to remove a higher resonance of the pickup 2 from the output of the phase compensation circuit 21, a variable gain amplifier 23, which controls a gain in accordance with the characteristic of the pickup 2 so that the zero cross frequency of the output of the notch filter circuit 22 becomes a predetermined value, and a tracking power amplifier 24, which drives the tracking coil 5 based on the output of the variable gain amplifier 23.

The tracking control circuit 15 comprises a notch frequency control circuit 25 and a gain control circuit 26. In other words, in the tracking control circuit 15, the notch frequency of the notch filter circuit 22 of the tracking servo circuit 11 is controlled by the notch frequency control circuit 25. At the same time, the gain of the variable gain amplifier 23 of the tracking servo circuit 11 is controlled by the gain control circuit 26.

As mentioned above, according to the embodiment of the present invention, resonance frequency (fb) and the gain of a predetermined zero cross frequency (fa) are written in EEPROM 14 as characteristic data when the pickup 2 is manufactured. Then, when power is applied, the written characteristic data is readout by the sequence control circuit 13 and set to the notch frequency control circuit 25 and the gain control circuit 26 as corresponding characteristic data. Thereby, the notch frequency of the notch filter circuit 22 of the tracking servo circuit 11 and the gain of the variable gain amplifier 23 are automatically controlled.

In other words, as shown in FIG. 3, since the resonance frequency (fb) of the pickup 2 scatters in the range of fb' to fb'', the notch frequency of the notch filter circuit 22 is controlled based on the characteristic data written in the EEPROM 14 and conformed to the resonance frequency (fb) as shown in FIG. 4. Also, the gain in the predetermined zero crossing frequency (fa) of the pickup 2 diviates in the range of a to a' as shown in FIG. 3, the gain of the variable gain amplifier 23 is controlled to be 0 dB in the predetermined zero cross frequency (fa) based on the characteristic data read from the EEPROM 14.

Furthermore, regarding the control of the notch frequency in the notch filter circuit 22, for example, an electronic volume (electronically variable resistance) serving as a twin T type notch filter using an arithmetic amplifier may be used in a resistor of the filter. Then, the value of the electronic volume may be controlled based on the characteristic data read from the EEPROM 14.

Also, regarding the control of the gain in the variable gain amplifier 23, for example, an electronic volume may be used in a feedback resistor of an amplifying circuit using arithmetic amplifier. Then, the value of the electronic volume may be controlled based on the characteristic data read from the EEPROM 14.

As mentioned above, the characteristic of the tracking servo loop is automatically controlled to be appropriate for the pickup 2 based on the characteristic data read from the EEPROM 14 of the mounted pickup 2.

The control of the characteristic of the flag servo loop and the measurement thereof will be explained.

FIG. 5 is a view showing the structure of a flag servo circuit 12 shown in FIG. 1. The flag servo circuit 12 comprises a light quantity detection circuit 31, which detects the amount of light-emitting of the LED 7 from the sum signal of the two-divided receiving regions of the photodetector 9, an automatic light quantity (power) control (LEDAPC) circuit 32, which inputs the amount of light-emitting detected by the detection circuit 31 and a setting light quantity, an LED driver 33, which drives LED 7 so that the amount light-emitting detected by the detection circuit 31 is conformed to the setting light quantity based on the output of the LEDAPC circuit 32, a lens position detection circuit 34, which detects the position of the objective lens 4 based on the difference signal of the two-divided light receiving regions of the photodetector 9, a compensating voltage output circuit 35, which outputs a set compensating voltage, and a subtracting circuit 36, which subtracts the output of the compensating voltage output circuit 35 from the output of the lens position detection circuit 34 and supplies the resultant output to the VCM driving circuit 10. In the flag servo circuit 12, the set light quantity is supplied to the LEDAPC circuit 32 via the sequence control circuit 13 and the flag control circuit 16 based on the characteristic data read from the EEPROM 14. At the same time, the compensating voltage is supplied to the compensating voltage output circuit 35. Thereby, the characteristic of the flag servo loop is automatically controlled to be appropriate for the pickup 2.

According to the above embodiment, when the pickup 2 is manufactured, output characteristics of the photodetector 9 against the amount of light-emitting of the LED 7 are written in EEPROM 14 as characteristic data. The written characteristic data is readout by the sequence control circuit 13 when power is applied. Thereafter, the characteristic data is set as a set light quantity of the LEDAPC circuit 32 via the flag control circuit 16. Thereby, the LED 7 is driven via the LEDAPC circuit 32 and the LED driver 33 so that the amount of light-emitting of the LED 7 is conformed to the set light quantity.

As mentioned above, if the amount of light-emitting of the LED 7 is conformed to the set light quantity, the position of the objective lens 4 correctly appears in the difference signal of the two-divided light receiving regions of the light detector 9. Therefore, the displacement of the objective lens 4 can be correctly detected by the lens position detection circuit 34.

Regarding the compensating voltage, every time power is applied, the value of the compensating voltage is measured and stored in the EEPROM 14 or the RAM within the CPU, and the stored compensating voltage may be set to the compensating voltage output circuit 35. Due to this, the output of the subtracter 36 is supplied to the sequence control circuit 13. After applying power, a state wherein the objective lens 4 is placed at the neutral position, that is, for example, the value of zero is set in the compensating voltage output circuit 35 immediately after loading the optical recording medium 1, and the output of the subtracter 36, that is, the output of the lens position detection circuit 34 is stored in the EEPROM 14 or the RAM as a compensating voltage via the sequence control circuit 13. At the same time, the output is set in the compensating voltage output circuit 35 via the flag control circuit 16. In a case where the compensating voltage is already stored in the EEPROM 14, in order to reduce the influence of errors occurring at one measurement, the compensating voltage is readout up to before the predetermined number from the EEPROM 14, and the average value, serving as a compensating voltage, is set to the compensating voltage output circuit 35 via the flag control circuit 16.

As a result, the signal to be output from the subtracter 36 in the real recording/reproducing mode is a signal wherein influence, which is caused by the shift between the neutral position of the objective lens 4 and the original point of the detection, is compensated. In other words, since this correctly shows the quantity shifted from the neutral position of the objective lens 4, the VCM 3 is driven via the VCM driving circuit 10 so that the output of the subtracter 36 becomes zero, thereby making it possible to constantly maintain the objective lens 4 at the neutral position. Therefore, a tracking address is readout from the optical recording medium 1 and the tracking servo is turned off, so that the VCM 3 is moved to the target track. Thereafter, if the tracking servo is turned on again, and a seek operation, which confirming the track address, is performed, seek accuracy is not lowered.

In other words, in the seek operation, when the tracking servo is turned off, the lens 4 is placed at the neutral position. If there is a shift between the neutral position the detection original point, seek accuracy is lowered by the shift when the tracking servo is turned on later to confirm the tracking address. In contrast, according to the present invention, since the objective lens 4 can be constantly contained at the neutral position in the recording/reproducing mode, such reduction of seek accuracy is not generated.

The present invention is not limited to the above-mentioned embodiment and various modifications or changes can be made. For example, the element for storing the characteristic of the pickup is not limited to EEPROM and a write-once PROM can be used. Moreover, in the above embodiment, the electronic volume is used to control the characteristic. However, it is possible to control the characteristic by use of the combination of an analog switch and a condenser, or a D/A converter. Furthermore, the present invention is not limited to the servo circuit in the periphery of the pickup. The present invention can be effectively applied to the control of an appropriate power value in a driving circuit of a laser diode or a binary level of a lead circuit.

As mentioned above, according to the present invention, there is provided means for storing specific characteristic data in a pickup and the operational characteristic is automatically set to be appropriate for the pickup based on the characteristic data stored in memory means. Due to this, it is unnecessary to manually control every apparatus. Thereby, productivity of the apparatus can be improved and maintenance can be improved since the manual readjustment is unnecessary when the pickup or the servo circuit is changed.

Additional embodiments of the present invention will be apparent to those skilled in the art in consideration of the specification and practice of the present invention disclosed herein. It is intended that the specification and examples be considered as exemplary only, with the true scope of the present invention being indicated by the following claims.

What is claimed is:

1. An information recording/reproducing apparatus, comprising:
    optical pickup means for recording/reproducing information to be recorded/reproduced to or from an optical recording/reproducing medium;
    memory means, provided within said optical pickup means, for storing specific characteristic data of said optical pickup means in advance, said memory means comprising a non-volatile memory;
    pickup relating means, coupled to said optical pickup means, for performing operations relating to recording/reproducing of said information by said optical pickup means;
    automatic controlling means, coupled to said memory means and to said optical pickup relating means, for reading said specific characteristic data stored in said memory means and automatically controlling characteristics relating to operations of said pickup relating means in accordance with said specific characteristic data;
    said optical pickup means including an optical pickup, which optically performs the recording/reproducing of said information in said optical recording/reproducing medium, and an optical pickup moving means for driving said optical pickup in a tracking direction substantially crossing a track of said optical recording/reproducing medium;
    said pickup relating means including at least one of a tracking servo loop and location control means for detecting a displacement of an objective lens from a neutral position to the tracking direction, and for causing said optical pickup moving means to control a location of said optical pickup in accordance with a detected displacement;
    said optical pickup comprising an objective lens for focusing a light beam for recording/reproducing on said optical recording/reproducing medium; a tracking coil for driving said objective lens in said tracking direction; and a photo detector for receiving response light to the optical recording medium and for detecting the displacement of the objective lens in the tracking direction; and
    a tracking servo circuit comprising:
        phase compensating circuit means for applying a phase-lead in the vicinity of a zero cross frequency of said tracking servo loop to the output of said photo detector;
        notch filter circuit means for setting a notch frequency in a resonance frequency to remove a higher resonance of said optical pickup from the output of said phase compensating circuit means;
        variable gain amplifier means for controlling the output of said notch filter circuit means in accordance with the characteristic of said optical pickup so that a gain in the zero cross frequency becomes a predetermined value; and
        tracking power amplifier means for driving said tracking coil in accordance with the output of said variable gain amplifier means.

2. An information recording/reproducing apparatus according to claim 1, further comprising:
    measuring means for measuring specific characteristic data of said pickup means when power is applied to said apparatus; and
    writing means for additionally writing the specific characteristic data measured by said measuring means into said memory means.

3. An information recording/reproducing apparatus according to claim 1, wherein said automatic control means operates when power is applied to said apparatus.

4. An information recording/reproducing apparatus according to claim 1, wherein said optical pickup further comprises light detection means for detecting a displacement of said objective lens from a neutral position in said tracking direction.

5. An information recording/reproducing apparatus according to claim 4, wherein said light detection means comprises:
    a flag provided to be movable together with the objective lens;
    light-emitting means for emitting light to said flag; and
    a flag light detector for receiving a projection image of said flag due to said light-emitting means.

6. An information recording/reproducing apparatus according to claim 5, wherein said light-emitting means includes a light-emitting diode.

7. An information recording/reproducing apparatus according to claim 5, wherein said flag light detector has two-divided light receiving regions.

8. An information recording/reproducing apparatus according to claim 1, wherein said automatic controlling means includes a sequence control circuit and a tracking adjusting circuit, and in order to control said tracking servo circuit via said sequence control circuit, said tracking adjusting circuit comprises:
    a notch frequency control circuit for controlling a notch filter of said notch filter circuit means; and
    a gain control circuit for controlling a gain of said variable gain amplifier means.

9. An information recording/reproducing apparatus according to claim 8, wherein a gain corresponding to said resonance frequency and said zero cross frequency is previously written in said memory means as said specific characteristic data.

10. An information recording/reproducing apparatus according to claim 1, wherein said memory means includes an electrically erasable and programmable read only memory (EEPROM).

11. An information recording/reproducing apparatus according to claim 1, wherein said optical pickup moving means includes a voice coil motor.

12. An information recording/reproducing apparatus, comprising:

optical pickup means for recording/reproducing information to be recorded/reproduced to or from an optical recording/reproducing medium;

memory means, provided within said optical pickup means, for storing specific characteristic data of said optical pickup means in advance, said memory means comprising a non-volatile memory;

pickup relating means, coupled to said optical pickup means, for performing operations relating to recording/reproducing of said information by said optical pickup means;

automatic controlling means, coupled to said memory means and to said optical pickup relating means, for reading said specific characteristic data stored in said memory means and automatically controlling characteristics relating to operations of said pickup relating means in accordance with said specific characteristic data;

said optical pickup means including an optical pickup, which optically performs the recording/reproducing of said information in said optical recording/reproducing medium, and an optical pickup moving means for driving said optical pickup in a tracking direction substantially crossing a track of said optical recording/reproducing medium;

said pickup relating means including at least one of a tracking servo loop and location control means for detecting a displacement of an objective lens from a neutral position to the tracking direction, and for causing said optical pickup moving means to control a location of said optical pickup in accordance with a detected displacement;

said optical pickup comprising an objective lens for focusing a light beam for recording/reproducing on said optical recording/reproducing medium; a tracking coil for driving said objective lens in said tracking direction; a photo detector for receiving response light to the optical recording medium and for detecting the displacement of the objective lens in the tracking direction; and light detection means for detecting a displacement of said objective lens from a neutral position in said tracking direction;

said light detection means for said optical pickup comprising a flag provided to be movable together with said objective lens; light-emitting means for emitting light to said flag; and a flag light detector means for receiving a projection image of said flag due to said light-emitting means, said flag light detector means including two divided light receiving regions; and said pickup relating means including at least said location control means, said location control means comprising:

light quantity detection circuit means for detecting the amount of light-emitting of said light-emitting means from a sum signal of said two divided light receiving regions of said flag light detector;

driving means for driving said light-emitting means;

automatic light quantity control circuit means for inputting a first quantity of light detected by said light quantity detection circuit means and a predetermined quantity of light, and for driving said driving means to drive said light-emitting means so that the amount of light-emitting of said light-emitting means becomes equal to said predetermined quantity of light, using said first quantity of light and said predetermined quantity of light;

lens position detection circuit means for detecting the position of said objective lens based on a difference signal of said two divided light receiving regions of said flag light detector means;

compensating voltage output circuit means for outputting a set compensating voltage; and subtracting circuit means for subtracting the output of said compensating voltage output circuit means from the output of said lens position detection circuit means, and for supplying an output to drive said optical pickup moving means.

13. An information recording/reproducing apparatus according to claim 12, further comprising:

measuring means for measuring specific characteristic data of said pickup means when power is applied to said apparatus; and writing means for additionally writing the specific characteristic data measured by said measuring means into said memory means.

14. An information recording/reproducing apparatus according to claim 12, wherein said automatic controlling means operates when power is applied to said apparatus.

15. An information recording/reproducing apparatus according to claim 12, wherein said light-emitting means includes a light-emitting diode.

16. An information recording/reproducing apparatus according to claim 12, wherein said memory means includes an electrically erasable and programmable read only memory (EEPROM).

17. An information recording/reproducing apparatus according to claim 12, wherein said optical pickup moving means includes a voice coil motor.

18. An information recording/reproducing apparatus according to claim 12, wherein said automatic control means includes a sequence control circuit, a driving circuit for driving said optical pickup moving means and a flag control circuit, said flag control circuit includes means for supplying said set light quantity to said automatic light quantity control means and means for setting the set compensating voltage to said compensating voltage output circuit, and said automatic control means said flag servo circuit via said flag control circuit.

19. An information recording/reproducing apparatus according to claim 18, wherein the output characteristic of said flag light detector to the receiving light amount is previously written in said memory means as said specific characteristic data.

20. An information recording/reproducing apparatus according to claim 18, wherein the output of said compensating voltage output circuit takes zero and the output of said subtracting circuit as said set compensating voltage, by said sequence control circuit when power is applied, is written in said memory means.

21. An information recording/reproducing apparatus according to claim 20, wherein said set compensating voltage, which is measured a plurality of times, is stored in said memory means and said sequence control circuit reads out the last data or all data of said set compensating voltage for a plurality of times from said memory means, and includes means for taking the average value for all the data.

* * * * *